Patented July 14, 1936

2,047,217

UNITED STATES PATENT OFFICE 2,047,217

SIZES

David M. McQueen and Warner J. Merrill, Wilmington, Del., assignors to E. I. du Pont de Nemours & Company, Wilmington, Del., a corporation of Delaware No Drawing. Application March 15, 1935, Serial No. 11,273

34 Claims. (Cl. 91—68)

This invention relates to the preparation and uses of emulsions, and particularly of emulsions containing salts of deacetylated chitin and their use in the impregnation and sizing of fibrous materials, such as paper, cloth, and the like.

This invention has as an object the preparation of aqueous emulsions comprising deacetylated chitin in the dissolved state, together with an emulsifying assistant, with or without a fixing agent. A further object is the preparation of finished textiles resistant to laundering. A still further object is the preparation of hard sized paper and particularly hard sized paper highly filled with pigments. A still further object is the provision of a process for sizing paper containing alkaline fillers with an emulsion of a water-repellent material. A still further object is an improved process for sizing paper. Other objects will appear hereafter.

These objects are accomplished by the following invention wherein an emulsion is prepared by agitating together an aqueous solution of a salt such as the acetate of deacetylated chitin, a water-repellent material which is a liquid under the conditions of emulsification and an acid stable emulsifying agent, with or without a fixing agent, this emulsion then being used in the sizing and impregnation of fibrous materials such as paper or cloth.

In the process of the present invention a water-repellent material is emulsified in a solution of a salt of deacetylated chitin. While the salts, and particularly the acetate of deacetylated chitin from shrimp shells are disclosed and form the preferred class, the invention is generally applicable to the use of, as emulsifying agents, deacetylated chitin insoluble in water or alkaline media but soluble in aqueous organic acid media, i. e., organic acid soluble deacetylated chitin. Instead of shrimp shell deacetylated chitin there may be used deacetylated chitin from crab and lobster shells or from the integuments of insects such as locusts and grasshoppers, and even chitin like materials from vegetable sources such as mycelium from fungi.

In copending application of George W. Rigby, Serial No. 731,600, filed June 25, 1934, there are disclosed methods for the preparation of suitable salts of deacetylated chitin. The method is briefly, purification of chitin bearing materials such as crab, shrimp, or lobster shells by successive mild alkali and acid washes until the chitin is free from protein and inorganic materials. This purified chitin is then deacetylated by treatment with alkali, for example, 40% sodium hydroxide, for such a length of time at such a temperature, for example, four hours at 110° C., that the material is soluble in dilute acetic acid to form viscous solutions from which coherent films may be obtained on evaporation. The above described copending application discloses how the conditions of deacetylation may be varied, how the viscosity of the material may be decreased by controlled oxidation, and increased by suitable heating of the solid material, and enumerates a large number of soluble salts which are generally suitable for the processes of the present invention.

The process of the present invention is broadly applicable in the emulsification of water-repellent liquids, i. e., those liquid under the conditions of emulsification and substantially insoluble in water. These include materials solid at room temperature or higher when used in solution in organic solvents or emulsified at a temperature of emulsification such that the material becomes liquid. Since aqueous solutions are employed in the process of the present invention, this requires that the material to be emulsified should be a liquid at some temperature between 0° and 100° C. approximately. If the emulsification be carried out under pressure, the material may be heated to even a higher temperature in order to liquefy it. The invention is thus applicable to the formation of emulsions of natural and synthetic waxes and wax-like materials, natural and synthetic resins, varnishes, oils, fats, cellulose derivatives, rubber, and rubber derivatives, and other water-repellent materials. The preferred waxes are paraffin waxes, Japan, Montan, carnauba, ceresin and Chinese insect waxes. Other waxes which may be used include candelilla, bayberry, cottonseed waxes, beeswax, and spermaceti. The waxes may be employed pure or in mixture with other emulsifiable materials.

The preferred wax-like materials include stearic acid, stearamide, lead oleate, aluminum stearate, cetyl alcohol, dioctadecyl ether, dioctadecyl thioether, and hydroxy stearic acid. Other wax-like materials which may be used include the higher fatty acids or alcohols containing 12 or more carbon atoms or their derivatives, such as the esters, ethers, ether-esters, polyesters, polyethers, amides, or N-substituted amides, sulfur derivatives, ureides, halides, anhydrides, and metal derivatives, including dodecyl alcohol, octadecyl alcohol, stearic acid, myristic acid, palmitic acid and their derivatives as indicated.

The preferred resins include cumarone resins, rosin, ester gum, damar, polybasic acid-polyhydric alcohol condensation products, as such, or modified with higher fatty acids such as stearic acid, or waxes, acrylic acid resins, alpha substituted acrylic acid resins, polymerization products of halogenated unsaturated hydrocarbons, rosin modified phenol-formaldehyde resins, and the resinous reaction product of beta-dichlorodiethyl ether and diphenylolpropane prepared as described in the copending application of James A. Arvin, Serial No. 651,634, filed January 13, 1932. Other resins which may be used include the chlorinated naphthalenes, chlorinated diphenyls, phenol-formaldehyde resins, vinyl resins, hydrolyzed vinyl resins treated with aldehydes, and cyclohexanone condensation products.

The preferred oils include China-wood, linseed, neat's-foot, mineral, and castor oils, altho other animal, vegetable or mineral drying, non-drying, or semi-drying oils may be used, including cottonseed, olive, rapeseed, sperm, cod liver, palm, peanut, and soya bean oils. Vegetable or animal fats such as tallow, butter fat, lard, cocoa butter and cottonseed stearin may also be used as well as hydrongenated oils such as hydrogenated castor, hydrogenated cottonseed, and hydrogenated soya bean oils.

Cellulose derivatives such as cellulose acetate, ethyl cellulose, benzyl cellulose, and cellulose nitrate may be employed. In the case of non-liquid materials such as these, as well as with resins, resin-wax, and resin-oil blends, it is necessary to liquefy these as for example by melting or solution in an organic solvent so that it is actually a solution which is emulsified.

While acid-resistant wetting agents, i. e., wetting agents functioning as such in acid solutions, in general may be employed, the preferred emulsifying assistant is diethylcyclohexylamine dodecyl sulfate. Other amine alkyl sulfates may be employed such as dimethylcyclohexylamine dodecyl sulfate and diethylcyclohexylamine 9, 10-octadecenylsulfate. Other acid-resistant wetting agents include sodium alkyl sulfates such as sodium dodecyl sulfate, octadecyl piperidide, saponin, cyclohexanolamine stearate, o-cyclohexanolamine dodecylsulfate, hexadecylbetaine, N-octadecylbetaine, N-octadecylcholine chloride, dimethyldioctadecyl ammonium halides, Irish moss, gum tragacanth, water-soluble cellulose ethers such as methyl cellulose, finely divided solids such as colloidal clays, and organic quaternary ammonium salts such as cetyltrimethylammonium bromide. These acid resistant wetting agents lower the interfacial tension between the emulsified and emulsifying phases and concentrated at the interface.

The preferred fixing agent is aluminum acetate, altho other aluminum, thorium, calcium, lead, zinc, and other polyvalent metal salts may be used. In view of the fact that the polyvalent metal salt should not precipitate the deacetylated chitin salt, i. e., must be soluble in the solution, sulfates should not be employed. However, formates, chlorides, nitrates, and acetates may be employed. In general, polyvalent metal salts soluble in the aqueous solution of the deacetylated chitin without reacting therewith may be employed. In general, low molecular weight monobasic acid salts such as the chlorides, nitrates, acetates, and formates are preferred.

This invention, while generally applicable in the impregnating, coating, and sizing of fibrous materials, has two main fields of usefulness, the treatment of textiles, and the sizing of paper, particularly the sizing of paper containing alkaline fillers. By the word "sizing" as employed herein is meant a water emulsion or dispersion of a water-repellent substance used to render paper fibers and filling pigments water-repellent when dry. Sized paper is therefore a water-resistant paper which has been treated with a size.

The manufacture of papers containing as much as 20-30% by weight of a filling pigment such as clay or calcium carbonate is a common and desirable practice in the paper industry. The incorporation of this high amount of filling pigment presents a real problem in the manufacture of a hard sized sheet. While it has been possible in the past to produce a hard sized sheet containing as much as 12-16% by weight of clay, when the amount is increased to 20% and above, the efficiency of rosin size is greatly impaired altho not completely destroyed. In the case of calcium carbonate as a filler however, the alkalinity of this filler destroys the efficiency of the rosin size and so far no practical solution has been provided by the art for the production of a hard sized sheet of paper highly filled with a pigment whether clay or calcium carbonate.

While paraffin has been disclosed as a size for paper filled with an alkaline filler, i. e., a filler which imparts an alkaline reaction to water and which on reaction with sulfuric acid liberates carbon dioxide, practical machine operation has demonstrated that such a paraffin size is not adequate for the production of a hard sized sheet highly filled with calcium carbonate and is objectionable in that the paraffin tends to collect on the wire and felts and so weakens the sheet that paper breaks frequently occur on the paper machine.

In the practice of the invention as applied to the sizing of paper, a water slurry of a pigment or pigments is treated with an emulsion containing a water-repellent composition in an amount equal to at least 2% by weight of the water-repellent material based on the pigment. The emulsion also contains an emulsifying agent insoluble in an alkaline medium and having unusual fixative properties, i. e., a salt such as an acetate of deacetylated chitin. The size is thoroughly fixed onto the pigment particles by the addition of an alkali which insolubilizes the deacetylated chitin. The sized slurry is mixed with paper pulp and paper made therefrom in accordance with regular paper making procedures.

Suitable size emulsions for the practice of this invention may be prepared as follows:

*Example 1*

Part 1 at 90° C.

| | Parts by weight |
|---|---|
| 2.9% solution of high viscosity partially deacetylated chitin acetate | 60.8 |
| Partially deacetylated chitin | 1.35 |
| Glacial acetic acid | 0.41 |
| Water | 59.04 |
| | 60.80 |

9.4% solution of aluminum acetate_____ 21.7

Part 2 at 95° C.

| | |
|---|---|
| Paraffin wax (M. P. 60°-65° C.) | 16.8 |
| Diethylcyclohexylamine dodecylsulfate | 0.7 |

Part 2 is added slowly to Part 1 which is agitated with a high speed stirrer. The emulsion thus formed is homogenized by passing it thru a colloid mill. A finely divided and stable emulsion is thus formed.

The emulsion is diluted to a 3% concentration of water-repellent (paraffin wax) by stirring in 460 parts by weight of water at 70°–80° C.

Example 2

Under the formula for the emulsion of Example 1, 25.2 parts by weight of a solution consisting of 11.8 parts of a cumarone resin such as "V-1/2 Cumar", 5 parts of a heat-bodied China-wood oil (viscosity of Y at 77° F. on the Gardner-Holdt scale), 4.2 parts of toluene and 4.2 parts of xylene is substituted for the 16.8 parts of paraffin wax. The same procedure for emulsifying and diluting is followed.

The emulsions thus prepared are positively charged; that is, if the emulsion is subjected to an external electromotive force, the dispersed phase will migrate to the cathode.

In the preferred practice of the invention, as related to the manufacture of water-resistant paper, the size emulsion is incorporated prior to sheet formation. The size may be deposited onto the fiber, onto the pigment, or onto both fiber and pigment. In the preferred operation of the process the size is deposited onto the pigment and this is carried out as an independent operation prior to mixing the pigment with paper pulp. A pigment slurry treated with a size emulsion may be prepared as follows:

The size emulsion is added to a water slurry of pigment, in an amount equal to at least 3.5% and preferably 5–8% of water-repellent substance based on the pigment. A solution of Paper Makers alum in an amount equal to 5% of alum based on the pigment may next be added, altho its use is not an essential element of the process. Following this a solution of an alkali, preferably ammonium hydroxide, is added in an amount sufficient to render the slurry neutral or alkaline (pH 7.0 to 8.5). Following this the treated slurry if alkaline may be rendered neutral by the addition of an acidic substance such as alum or sulfuric acid, altho again this is not an essential element of the process. A solution of starch may be added to the treated slurry in order to improve the finish, formation, and strength of the paper. In the above treatment, the pigment slurry is thoroughly agitated during its modification, and the modifying agents are added slowly to insure uniform distribution.

The treated slurry of pigment is now ready for admixture with paper pulp preparatory to sheet formation. In plant operation the supply of the treated slurry is kept ahead of machine requirements by at least one hour. The advance supply may be regulated at will to fit the requirements because the properties of the treated slurry do not change thru standing for several hours or longer. The treated slurry should, however, be agitated during storage so that the pigment remains in suspension.

The treated slurry is added to the paper pulp at any convenient point in the system prior to the sheet forming wire. The only limitation is that the fibers and the calcium carbonate should be uniformly distributed in the water before the stock passes onto the paper machine. The mixing may be carried out in the beater, in the machine chest, or at the regulating box. It is preferred to mix after the pulp has passsed thru the Jordan, that is, in the machine chest or at the regulating box. When the mixing is carried out at the regulating box, the treated slurry of pigment is fed as a continuous stream to the water that goes to the regulating box to dilute the pulp to a paper making consistency. The quantity of pigment delivered per unit time is dependent upon the amount of calcium carbonate required in the finished sheet, and in turn for a given amount in the sheet, the amount of pigment required in the fiber-pigment suspension is dependent upon the freeness of the pulp, the speed of the machine, the amount of suction, etc. In general, the stock furnished to the machine contains from 50% to 130% by weight of pigment based on the fiber in the manufacture of a highly filled sheet. The same principle is followed when the treated slurry of pigment is mixed with the paper pulp in the machine chest.

The following examples illustrate the application of emulsions such as those disclosed in Examples 1 and 2 to the process of paper making. They are merely illustrative and are not in any way limitative:

Example 3

The beater charge consists of 80 parts of soda pulp, 20 parts of bleached sulfite pulp (air dry basis), and the usual amount of water. The beaten pulp is dropped to the beater chest, from which it is pumped to the Jordan engine. The pulp from the Jordan is discharged into the machine chest, from which it is pumped to the regulating box. At the regulating box the pulp is diluted to a paper making consistency with water containing calcium carbonate sized as described below. The stock is then screened and formed into paper on a Fourdrinier paper machine operating at a normal speed.

The calcium carbonate is sized as follows: To 450 parts by weight of a 17.8% water slurry of calcium carbonate (pH 7.8) are added in the order given 160 parts by weight of emulsion of Example 1, 133 parts by weight of a 3% solution of Paper Makers alum, 12.5 parts by weight of a 7% solution of ammonium hydroxide and 120 parts by weight of a 4% solution of a heavy boiling corn starch. At this point the pH of the slurry is 9.0, and this is brought back to 7.8 by the addition of a dilute solution of sulfuric acid. The calcium carbonate slurry is kept well agitated during the mixing operation. The slurry is thinned with about 450 parts by weight of water and discharged into a storage chest from whence it is pumped to the diluting water going to the regulating box.

The volume of the sized slurry delivered per unit time to the diluting water is regulated so that the finished sheet contains 20% by weight of calcium carbonate.

A 53 pound basis weight sheet (25 x 38 x 500 ream) containing 20% by weight of calcium carbonate has a water resistance of 25 seconds by the standard dry indicator method, and a Mullen bursting strength of 10 pounds.

Example 4

A beater is furnished with 50 parts of soda pulp, 50 parts of bleached sulfite pulp (air dry basis) and the usual amount of water. After the pulp has been given the desired amount of beating, the beater roll is raised and a sized calcium carbonate slurry is added. This sized slurry is prepared as follows: 130 parts of the emulsion of Example 2, 108.5 parts of 3% alum, 10.1 parts of 7% ammonium hydroxide, and 65 parts of a 5% solution of a heavy boiling corn starch are added in the order given to 650 parts of a 10% water slurry of calcium carbonate (pH 7.8 before treatment and pH 9.0 after treatment) with thorough agitation during the mixing operation. After this slurry has been added the beating is continued until the pigment is well mixed with the fiber. The charge is then removed from the beater and diluted with water to a paper making consistency. Sheets are formed on a standard sheet mold, pressed, and dried at 100°–110° C.

A 50 pound basis weight sheet containing 25% by weight of calcium carbonate has a water resistance of 25 seconds by the dry indicator test.

*Example 5*

The procedure of Example 4 was followed with the exception that the emulsion of Example 1 was substituted for that of Example 2 and Paper Makers clay was substituted for calcium carbonate. It was found that a 50 pound basis weight sheet containing 25% of clay had a water resistance of 27 seconds by the dry indicator test.

*Example 6*

A beater is charged with 50 parts by weight of soda pulp, 50 parts of bleached sulfite pulp (air dry basis) and the usual amount of water. After the pulp has been beaten to the desired extent, the beater roll is raised and the fiber sized as follows: 66.6 parts by weight of the emulsion of Example 1, and 16.0 parts by weight of .10% ammonium hydroxide are added in the order given to the beater. The sized pulp has a pH of 7.3. Circulation in the beater is continued during the mixing operation, and a sufficient time element is allowed to elapse between the addition of each solution to permit thorough distribution before addition of the subsequent solution. Finally, 650 parts by weight of a 10% slurry of calcium carbonate and 100 parts by weight of a 5% solution of a heavy boiling corn starch are added. After being thoroughly mixed the contents of the beater are discharged into a chest and diluted to a paper making consistency. Sheets are formed on a standard sheet mold, pressed, and dried at 100°–110° C.

A 50 pound basis weight sheet containing 25% by weight of calcium carbonate has a water resistance of 28 seconds by the dry indicator test.

About the same water resistance is obtained if clay is substituted for calcium carbonate in this example.

*Example 7*

This illustrates the internal sizing of paper free from filler by treatment of paper pulp prior to sheet formation.

A beater is charged with 50 parts by weight of soda pulp, 50 parts by weight of bleached sulfite pulp (air dry basis), and the usual amount of water. After the pulp has been given an average amount of beating, the beater roll is raised and 66.6 parts by weight of the emulsion of Example 1 is added. After the emulsion is well mixed with the pulp, a 5% solution of ammonium hydroxide is added until the pulp water has a pH of about 7.0. The sized pulp is discharged from the beater, diluted with water to a suitable paper making consistency, formed into sheets, and the sheets pressed, dried at 100°–110° C. and calendered.

The sheets are characterized by high water resistance, good strength, and excellent finish. A 63-pound basis weight sheet (25 x 38 x 500 ream) has a water resistance of 120 seconds (measured by the standard dry indicator method), and a Mullen bursting strength of 40 pounds. Sheets sized with rosin by the substitution of 66.6 parts of 3% rosin size solution and 66.6 parts of 3% Paper Makers alum solution for the emulsion of Example 1 and 5% ammonium hydroxide in the above example, have a water resistance of 90 seconds and a Mullen bursting strength of 40 pounds. A particular advantage of the emulsion of Example 1 is that the sized pulp is neutral or very slightly alkaline so that corrosion of machinery, and degradation and discoloration of the paper with age which are caused by the acidity of alum are eliminated. In addition, the emulsion of Example 1 size solids do not cause discoloration of paper. Consequently, the process of this invention is particularly applicable for the sizing of high grade, permanent bond papers.

*Example 8*

This illustrates the surface sizing of paper. The operation may be carried out on a partially dried or completely dried sheet during the primary paper making operation, or as a secondary process on a dry sheet.

A 60-pound basis weight (24 x 36 x 480 ream) sheet of rosin sized kraft paper made from a southern kraft pulp is immersed in a bath of the emulsion of Example 1 (diluted with water to a 0.7% concentration of paraffin wax) operated at about 70° C., passed between squeeze rolls to remove excess emulsion from the surface and dried at about 100° C. This treatment incorporates with the sheet 0.60% of the emulsion of Example 1 solids based on the sheet weight. The treated sheet has a water resistance of 133 seconds, which compared with 49 seconds before treatment. Thus, the water resistance of the sheet is increased 169% with 0.6% of the emulsion of Example 1 size solids. The size also improves the finish, scuff-resistance, gloss, moistureproofness, and writing and printing properties.

Similar results are obtained from application of the size emulsion to the sheet during the primary paper making operation. This may be carried out at an intermediate stage in the drying operation by means of a size press which is located in the drying system at a point where the sheet is approximately 60% dry. The partially dried sheet passes thru a bath of the size emulsion operated preferably at an elevated temperature (50°–80° C.), then thru squeeze rolls, and thence onto additional driers to complete the drying operation. Another method is to apply the size emulsion on the calender stack by means of so-called "water boxes". The size emulsion is fed from the water box to the calender roll which in turn carries the emulsion to the surface of the sheet as the sheet passes thru the nip represented by the roll carrying the emulsion and the roll directly above. Either one or both sides of the sheet may be treated by providing one or two water boxes. The size emulsion is operated in the water boxes at an elevated temperature such as 70° C. to 90° C. A combination of size press and calender water box application gives very excellent results. The sheet coming to the size press may be beater sized with the emulsion of Example 1, rosin, etc., or it may be unsized. Calender treatment requires a sheet that has been beater sized with the emulsion of Example 1, rosin, or any suitable water-repellent composition for beater application.

The process of the invention as applied to paper making is operable with any pigment whether acid, neutral, or alkaline which may be used in the paper industry. In addition to calcium carbonate and clay other pigments such as lithopone, talc, barium and calcium sulfates, barium carbonate, titanium dioxide, titanium dioxide extended with calcium or barium sulfate or carbonate, may be employed. The process is particularly effective in the case of an alkaline filler such as calcium carbonate. A slurry of an alkaline filler may be quite alkaline without having any detrimental influence on sizing efficiency when the slurry is treated with a size emulsion by the process of the present invention. Thus, in Example 3 the pH of the calcium carbonate slurry before treatment may be built up to 10.7 or higher by the addition of lime water without affecting the water resistance of the paper.

The paper web may be treated at any point on the paper machine with size emulsions described herein. This may be done at the wet end of the paper machine by spray or transfer roll application of the size emulsion, which latter may be carried out by allowing the bottom part of the guide roll to operate in a bath of the size emulsion, which is thus carried to the wire from which it is absorbed by the web. A sized slurry of pigment may also be incorporated into the web at the guide roll by this method. A size precipitant is not required when the size emulsion is applied subsequent to sheet formation. Thus, paper may be sized with the emulsions of the present invention at all stages, i. e., paper as pulp, as web, and as sheet may be sized.

The size emulsions herein described may be used in conjunction with other size compositions. Thus, the paper pulp may be sized with rosin by regular procedures and the filling pigment sized by the process of this invention, or a size such as rosin size may be added to paper pulp which is followed by the addition of a size emulsion as herein described.

The second great field of utility of the emulsions and emulsion applications of the present invention is that of the treatment of textiles. For this purpose a variety of emulsions may be employed, such as are disclosed in the following examples:

*Example 9*

Fifty parts of high melting paraffin wax are melted with 2.1 parts of diethylcyclohexylamine dodecylsulfate and the mixture at 90° C. is poured slowly into an aqueous phase, at 70° C. or above, composed of 3.9 parts of deacetylated chitin of the type hereinbefore mentioned, 1.2 parts of glacial acetic acid, 12.9 parts of aluminum acetate and 229.8 parts of water. High speed agitation should be employed, and the emulsion thus formed is passed thru a colloid mill or homogenizer.

*Example 10*

Fifteen hundred parts of paraffin melting around 40° C., 97 parts stearic acid and 63.5 parts of diethylcyclohexylamine dodecylsulfate are melted together and kept at 90°–100° C. An aqueous phase consisting of 3370 parts of a 3.5% deacetylated chitin solution, containing 1.1% glacial acetic acid, 2709 parts of a 14.4% aluminum acetate solution, containing 11% free acetic acid and 1317.5 parts of water is prepared and heated to 75°–80° C. The wax phase is then poured slowly with vigorous agitation into the aqueous phase and the resulting emulsion passed thru a colloid mill.

While the above example discloses a procedure wherein the water-repellent material is emulsified in an aqueous medium containing the fixing agent, e. g., aluminum acetate, the aqueous phase need contain no fixing agent as in the following Example 11 or the fixing agent may be added after the emulsion has been formed, as is exemplified in Example 12.

*Example 11*

One hundred thirty parts of a 3% deacetylated chitin solution, containing 3% acetic acid, and 117.8 parts of water are heated together to 80°–90° C. A melted mixture of 50 parts paraffin wax and 2.1 parts cyclohexanolamine stearate is poured into this aqueous phase with high speed stirring and the resulting emulsion is then passed thru a colloid mill.

*Example 12*

Sixteen and seven-tenths parts paraffin are melted with 0.7 part diethylcyclohexylamine dodecylsulfate. An aqueous phase is prepared by heating together 43.3 parts of a 3% deacetylated chitin solution containing 3% acetic acid and 29.3 parts of water. The wax phase is then poured slowly into the aqueous phase at 80°–90° C. while stirring vigorously. Ten parts of a 19% aluminum acetate solution containing 15% free acid are then added to the emulsion and the whole passed thru a colloid mill.

These compositions are stable, finely divided emulsions which may be diluted largely with water, and which, even in this dilute form, are quite stable at low or elevated temperatures. They are positively charged and are stable to hydrogen ion, hard water, and cations but are precipitated by appreciable amounts of strongly adsorbed anions, such as sulfate-ion and hydroxyl-ion.

To obtain a water-repellent finish on textile fabrics, without disadvantageously altering the feel of the goods, one of the wax emulsions described in the examples, especially Examples 9, 10, and 12, is suitably diluted, for example, about 25 parts of emulsion to 1000 of water. The dilute emulsion is then applied by known methods of impregnation, such as spraying, by the use of a padder, mangle, jig, or the like. Since the diluted emulsions are stable at elevated temperatures, it is advantageous to use the impregnating bath at 50°–90° C. altho it can be used at lower temperatures. The above concentration is usually ample, altho in certain cases it may be desirable to increase the amount of emulsion, as for example, where the goods are dyed with sulfur dyes and are therefore difficult to wet out. The impregnated materials may be treated with alkali such as ammonia or other insolubilizing agents before or after drying.

Should a resistance to water pressure be required, the emulsion can be used in a more concentrated state so that the product will be classed as a coated fabric.

The following examples illustrate the use of the above emulsions in impregnating textiles:

*Example 13*

Eighteen parts of the emulsion of Example 9 were diluted with 282 parts of water and the resultant emulsion heated to 70°–85° C. This was then applied to cotton shower curtain material in a mangle, the fabric dried at an elevated temperature such as 300° F., and then calendered.

*Example 14*

Rayon piece goods were impregnated at 70°–85° C. by means of a padder with an emulsion containing 20 parts of the emulsion of Example 10 in 280 parts of water, dried and calendered.

*Example 15*

Silk stockings after rinsing were placed in a standing bath of 3% emulsion prepared by dilution of the emulsion of Example 12, which bath was maintained at 40° to 80° C. After thorough impregnation the stockings were boarded and dried at an elevated temperature.

The fabrics had a water-repellent finish and were markedly superior, in laundry resistance of the finish, to fabrics treated with emulsions containing casein, gelatin, glue, and other acid stable materials in place of the deacetylated chitin. They were also superior to fabrics treated with emulsions wherein soaps, sulfonated oils, and other acid unstable emulsifying agents were used in place of deacetylated chitin, and then treated with aluminum acetate, formate, sulfate, etc., solutions.

In place of the cotton, rayon, and silk of the above examples, other textiles such as wool, linen, yarns or fabrics may be employed. Rope, fishing tackle, sail cloth, awnings, union fabrics, book cloth, table cloths, etc., may advantageously be impregnated with the emulsions of the present invention. Leather may also be treated, the finished skin before or after glazing being sprayed with an emulsion diluted perhaps to 2.5% solids content, then glazed, plated, and ironed to a water-resistant finish.

While fixing agents as exemplified by the aluminum acetate of several of the examples are not absolutely necessary, they are highly desirable inasmuch as improved stability and improved fixing action generally follow the addition of these soluble salts of polyvalent metals which are soluble without perceptible reaction in the emulsion. Emulsions containing these fixing agents but no acid-resistant wetting agent may be prepared but are not as advantageous as those of the present invention.

The examples of emulsions useful in the impregnation of textiles and in the sizing of paper have indicated a wide range of conditions as to the amount of deacetylated chitin, the amount of water-repellent material, the amount of acid-resistant wetting agent, and the amount of fixing agent. These can be varied considerably from the preferred amounts given in the examples and yet come within the scope of the invention.

One of the chief advantages of the present invention in the superior retention of the compositions of the present invention by the base materials to which they are applied, due to the peculiarly effective binding or fixing action of the deacetylated chitin. In connection with the preparation of sized paper certain figures have been given. In connection with the application to textiles it may be mentioned that a paraffin-diethylcyclohexylamine dodecylsulfate-aluminum acetate-deacetylated chitin system applied to silk crepe gives a water-repellent finish which lasts thru 10 to 15 launderings with soap and water whereas the emulsions now used in the trade give a finish which lasts for 1–4 launderings. This superior laundry fastness is attributed mainly to the strong fixative action of the deacetylated chitin. This same durability is manifested in the case of materials exposed to the atmosphere by the increased resistance to weathering. This has been observed with a composition similar to that above mentioned, applied to auto top materials. When applied to leather the coating possesses an improved resistance to wet and dry rubbing. The emulsions are of value as sizes for wool or felt hats. In the sizing of felt hats, water resistance but not stiffness is desirable in the crown of the hat. This may be obtained by the use of the emulsions of the present invention.

The emulsions are broadly applicable to the sizing of fibrous or porous materials and such articles coated with a coating from such an emulsion show improved resistance to deteriorative external influences such as laundering and the like. A particular application of the emulsions of the type of the present invention to the impregnation of paper with extremely desirable results is disclosed in copending application of L. B. Arnold, Jr., Serial No. 63,796, filed Feb. 13, 1936.

The above description and examples are intended to be illustrative only. Any modification of or variation therefrom which conforms to the spirit of the invention is intended to be included within the scope of the claims.

We claim:

1. An emulsion comprising an aqueous solution of a salt of deacetylated chitin, a water-repellent material liquid under the conditions of emulsification, and a fixing agent.

2. An emulsion comprising an aqueous solution of a salt of deacetylated chitin, a water-repellent material liquid under the conditions of emulsification, and an acid-resistant wetting agent.

3. An emulsion comprising an aqueous solution of an acetate of deacetylated chitin, a water-repellent material liquid under the conditions of emulsification, and an acid-resistant wetting agent.

4. An emulsion comprising an aqueous solution of a salt of deacetylated chitin, a water-repellent material liquid under the conditions of emulsification, an acid-resistant wetting agent, and a fixing agent.

5. An emulsion comprising an aqueous solution of a salt of deacetylated chitin, a wax, and an acid-resistant wetting agent.

6. An emulsion comprising an aqueous solution of a salt of deacetylated chitin, paraffin wax and an acid resistant wetting agent.

7. An emulsion comprising an aqueous solution of a salt of deacetylated chitin, paraffin wax, and diethylcyclohexylamine dodecylsulfate.

8. An emulsion comprising an aqueous solution of a salt of deacetylated chitin, a wax, an acid-resistant wetting agent, and a fixing agent.

9. An emulsion comprising an aqueous solution of a salt of deacetylated chitin, a wax, an acid resistant wetting agent, and aluminum acetate.

10. An emulsion comprising an aqueous solution of a salt of deacetylated chitin, paraffin wax, an acid resistant wetting agent, and aluminum acetate.

11. An emulsion comprising an aqueous solution of a salt of deacetylated chitin, paraffin wax, aluminum acetate, and diethylcyclohexylamine dodecylsulfate.

12. A process which comprises applying to a fibrous material an emulsion comprising an aqueous solution of a salt of deacetylated chitin, a water-repellent material liquid under the conditions of emulsification, and an acid-resistant wetting agent.

13. A process which comprises applying to a fibrous material an emulsion comprising an aqueous solution of a salt of deacetylated chitin, a water-repellent material liquid under the conditions of emulsification, an acid-resistant wetting agent, and a fixing agent.

14. A process which comprises applying to a fibrous material an emulsion comprising an aqueous solution of a salt of deacetylated chitin, a wax, and an acid-resistant wetting agent.

15. A process which comprises applying to a fibrous material an emulsion comprising an aqueous solution of a salt of deacetylated chitin, a wax, an acid-resistant wetting agent, and a fixing agent.

16. A process which comprises applying to a textile material an emulsion comprising an aqueous solution of a salt of deacetylated chitin, a water-repellent material liquid under the conditions of emulsification, and an acid-resistant wetting agent.

17. A process which comprises applying to paper an emulsion comprising an aqueous solution of a salt of deacetylated chitin, a water-repellent material liquid under the conditions of emulsification, and an acid-resistant wetting agent.

18. A process which comprises applying to paper an emulsion comprising an aqueous solution of a salt of deacetylated chitin, a water-repellent material liquid under the conditions of emulsification, and a fixing agent.

19. A process which comprises applying to paper an emulsion comprising an aqueous solution of a salt of deacetylated chitin, a water-repellent material liquid under the conditions of emulsification, an acid-resistant wetting agent, and a fixing agent.

20. A process which comprises applying to paper pulp an emulsion comprising an aqueous solution of a salt of deacetylated chitin, a water-repellent material liquid under the conditions of emulsification, an acid-resistant wetting agent, and a fixing agent.

21. A process which comprises applying to paper pulp an emulsion comprising pigment, an aqueous solution of a salt of deacetylated chitin, a water repellent material liquid under the conditions of emulsification, an acid-resistant wetting agent, and a fixing agent.

22. A process which comprises applying to paper pulp an emulsion comprising pigment, an aqueous solution of a salt of deacetylated chitin, a water repellent material liquid under the conditions of emulsification, an acid-resistant wetting agent, and a fixing agent, and precipitating the emulsion on to the paper pulp.

23. A process which comprises adding to an aqueous slurry of pigment an emulsion containing a salt of deacetylated chitin, a water-repellent material liquid under the conditions of emulsification, an acid-resistant wetting agent, and a fixing agent, adding alkali until the slurry has a pH of 7.0 to 8.5, and adding the treated slurry so obtained to paper pulp.

24. A process which comprises applying to paper pulp an emulsion comprising an aqueous solution of a salt of deacetylated chitin, a wax, and an acid-resistant wetting agent.

25. A process which comprises applying to paper pulp containing an alkaline filler an emulsion comprising an aqueous solution of a salt of deacetylated chitin, a water-repellent material liquid under the conditions of emulsification, an acid-resistant wetting agent, and a fixing agent.

26. A process which comprises applying to paper pulp containing an alkaline filler an emulsion comprising an aqueous solution of a salt of deacetylated chitin, a wax, and an acid-resistant wetting agent.

27. A process which comprises applying to paper pulp containing an alkaline filler an emulsion comprising an aqueous solution of a salt of deacetylated chitin, a wax, and an acid-resistant wetting agent, and precipitating the emulsion on to the paper pulp.

28. A process which comprises applying to a textile material an emulsion comprising an aqueous solution of a salt of deacetylated chitin, a water-repellent material liquid under the conditions of emulsification, an acid-resistant wetting agent, and a fixing agent.

29. A fibrous material combined with a water-repellent-deacetylated chitin composition, said composition being deposited from an emulsion comprising an aqueous solution of a salt of a deacetylated chitin, a water-repellent material liquid under the conditions of emulsification, and an acid-resistant wetting agent.

30. A textile material combined with a composition comprising an emulsified water-repellent material, and an acid soluble deacetylated chitin, said composition being deposited from the emulsion comprising an aqueous solution of a salt of deacetylated chitin, a water-repellent material liquid under the conditions of emulsification, and an acid-resistant wetting agent.

31. A textile material impregnated with a composition comprising an emulsified wax, deacetylated chitin, an acid-resistant wetting agent, and a fixing agent.

32. Paper sized with a composition comprising an emulsified water-repellent material, an acid soluble deacetylated chitin, and an acid-resistant wetting agent.

33. Paper containing an alkaline filler sized with a composition comprising an emulsified water-repellent material, an acid soluble deacetylated chitin, and an acid-resistant wetting agent.

34. Paper sized with a composition comprising an emulsified wax, deacetylated chitin, an acid-resistant wetting agent, and a fixing agent.

DAVID M. McQUEEN.
WARNER J. MERRILL.